MULTIFREQUENCY SIGNAL RECEIVER

Filed May 19, 1961 3 Sheets-Sheet 1

INVENTORS C. G. MORRISON
D. T. SEWARD
BY E J Olnider
ATTORNEY

INVENTORS: C. G. MORRISON
D. T. SEWARD
BY: E J Oleider
ATTORNEY

INVENTORS C. G. MORRISON
D. T. SEWARD
BY E. J. Cluider
ATTORNEY

United States Patent Office 3,143,602

Patented Aug. 4, 1964

3,143,602
MULTIFREQUENCY SIGNAL RECEIVER

Charles G. Morrison, Livingston, and Douglas T. Seward, Avenel, N.J., assignors to Bell Telephone Laboratories, Incorporated, New York, N.Y., a corporation of New York Filed May 19, 1961, Ser. No. 111,307
8 Claims. (Cl. 179—84)

This invention relates to multifrequency signaling systems and more particularly to multifrequency signal receivers and its general object is to increase the reliability of such receivers.

Multifrequency signaling systems typically employ various encoded patterns of tone bursts for the transmission of signaling information. One illustrative system of this type, which is described in detail by L. Schenker in the January 1960 issue of the Bell System Technical Journal, employs a so-called 4 x 4 multifrequency code which utilizes selected combinations of coincident two-tone bursts, each combination including one tone from a band of relatively high frequencies and one from a band of relatively low frequencies. Incoming signals are split into two groups by a pair of band elimination filters, each of which rejects a respective unwanted group of frequencies. Each of the two signal groups is in turn applied to a respective limiter whose output is a square wave containing the fundamental and odd harmonics of the dominating frequency component of the incoming signal. Each of the two limiter outputs is in turn applied to a respective group of tuned circuits, each of the tuned circuits being resonant at a preselected one of the signal frequencies. Outputs from the tuned circuits may then be used in accordance with the needs of the particular communication system in which the signal receiver is used.

In a receiver of the type described it is possible for spurious signals to produce an output from one or more of the tuned circuits so long as such signals meet the particular frequency and amplitude requirements imposed. In a voice system, for example, where voice frequency signaling is also employed, the signal receiver may be operated falsely by frequency components derived either from noise or from voice transmission which components correspond in frequency to the preselected signaling frequencies. It is known, however, that spurious signals usually include a number of frequency components in addition to the critical signaling frequency while a bona fide signal more generally consists of a relatively pure tone. This difference in characteristics has led to the employment of various systems for the accentuation or pre-emphasis of so-called "guard frequencies" before any input is applied to the limiter, guard frequencies denoting frequencies other than signaling frequencies. Guard frequencies are thus enabled to compete effectively for control of the limiter with spurious frequency components which occur at the signaling frequencies. Although the use of accentuated guard frequencies reduces the probability of false receiver operation, such protection has been attained heretofore only at the cost of a substantial increase in circuit complexity. Moreover, the employment of preemphasized guard frequencies alone has been less than fully effective in eliminating digit simulation by spurious signals.

Accordingly, a specific object of the invention is to avoid digit simulation in a multifrequency signaling receiver without resort to complex circuitry. A related object is to reduce the likelihood of digit simulation in a multifrequency signal receiver without substantial impairment of receiver response to bona fide signals.

These and other objects are achieved in accordance with the principles of the invention by the use of a limiter with a frequency-dependent, negative feedback circuit that is uniquely related to the selective tuned circuits of the receiver. More specifically, in accordance with one aspect of the invention the sensitivity of the limiters and hence of the receiver is reduced across a relatively wide band of frequencies by the application of negative feedback and further, the particular level of limiter sensitivity remains fixed substantially independent of circuit parameters.

So long as full limiting occurs, the limiter provides a constant output amplitude and the signal fed back at a particular frequency is also of constant amplitude. To obtain the desired receiver sensitivity, however, the constants of the feedback network are chosen, in accordance with the invention, so that the amplitude of the feedback is relatively small compared to the signal into the limiter at relatively high signal levels. As the input signal approaches the desired lower limit of sensitivity, however, the amplitude of the signal fed back is of high enough relative amplitude to oppose the input signal to the point at which the net signal no longer produces limiting. The limiter output amplitude is then below the level required to drive a tuned circuit to produce an output of sufficient magnitude to operate a detector and, as a result, the receiver is protected against false operation by spurious signals which occur below the selected threshold.

Additionally, as indicated above, in a system in accordance with the invention limiter sensitivity is established at a level that remains fixed substantially independent of the limiter circuit parameters. This condition follows from the fact that a limiter may be designed to produce an output of fixed amplitude and waveform, irrespective of limiter circuit parameter variations and irrespective of input level down to net input amplitudes considerably less than the desired limiter sensitivity. It follows that a signal fed back from a limiter, in accordance with the invention, being dependent on the output signal, will also be of fixed amplitude and waveform over the same range of net input amplitudes, irrespective of limiter circuit parameter variations. Thus, the sensitivity, being dependent on the relative amplitudes of input and feedback, is necessarily substantially independent of limiter circuit parameter variations.

In accordance with a second aspect of the invention negative feedback, in addition to its use as a means for achieving over-all receiver sensitivity control, is also used as a means for achieving pre-emphasis of guard frequencies. By arranging for the output of the limiters to drive the selective tuned circuits directly, voltage peaks are made to occur in the negative feedback signal precisely at each of the bona fide signaling frequencies and hence, in accordance with the invention, an optimum pattern of guard frequencies is achieved by the action of the limiter itself without resort to additional equalizing or pre-emphasizing circuitry. Although payment for such protection is necessarily extracted in the form of some reduction in signal-to-noise ratio, the effects of such reduction are comparatively slight in view of the resulting gain in protection against digit simulation.

Accordingly, one feature of the invention is a limiter, in a multifrequency receiver, which includes a negative feedback circuit so arranged that the amplitude-frequency characteristic of the feedback signal is determined directly by the characteristics of the receiver's tuned circuits.

Another feature of the invention is the dual achievement of a selective reduction in receiver sensitivity and the pre-emphasis of preselected guard frequencies by the employment of negative feedback in the limiter circuits of a multifrequency receiver.

The principles of the invention and additional objects and features thereof will be fully apprehended from the following detailed description of an illustrative embodiment and from the accompanying drawing in which.

Figure 1:
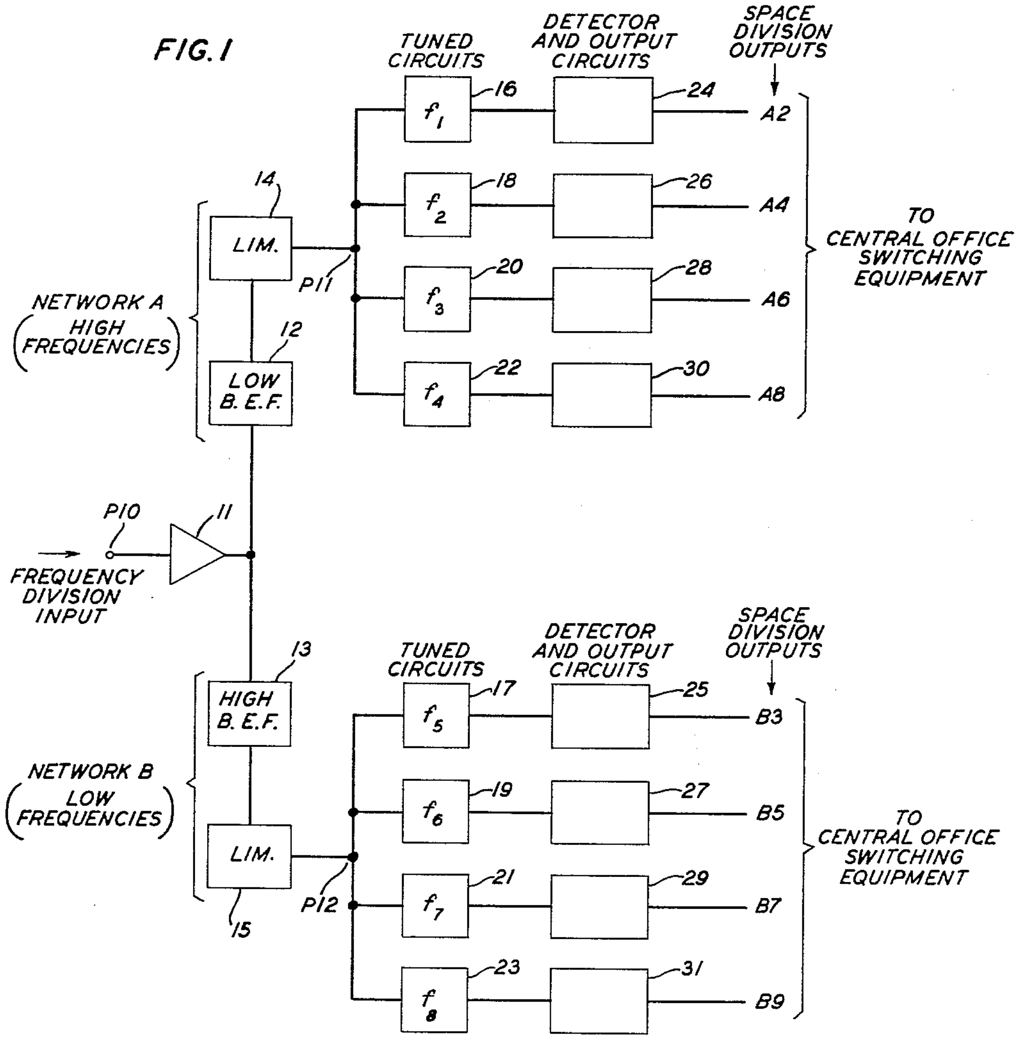
FIG. 1 is a block diagram of a multifrequency receiver including negative feedback limiters in accordance with the invention.

The receiver shown in FIG. 1 includes a network A designed for the identification and translation of relatively high frequency signals and a network B designed for the identification and translation of relatively low frequency signals. Signals are first applied on a frequency-division input basis to input point P10 and are amplified by amplifier 11. Signals in the low frequency band are eliminated by the band elimination filter 12 and frequencies in the high frequency band are similarly eliminated by the band elimination filter 13. In high frequency network A the output of the low band elimination filter 12 is applied to the limiter 14 as a sine wave, assuming that the receiver input includes only a pair of pure tones, or, as a complex wave, assuming that spurious tones from noise or speech are also present. If the input to limiter 14 is of sufficient amplitude for limiting to occur, the limiter output is a train of square or rectangular pulses having constant amplitude at a frequency determined by the dominant frequency component of the input signal. At point P11 the output of limiter 14 is applied in parallel to each of the tuned circuits 16, 18, 20, and 22. If the tuned circuit input corresponds to one of the resonant frequencies $f_1$ through $f_4$, the corresponding tuned circuit produces an output which is in turn applied to a respective one of the detector and output circuits 24, 26, 28, or 30. The final output signal occurring at output point A2, A4, A6, or A8 is a direct current step signal or pulse which is suitable for initiating the operation of conventional central office switching equipment. The output circuits 24, 26, 28, and 30 may include a suitable interconnecting logic circuit to ensure the development of only a single space division output during any single increment of time. An illustrative circuit of that type is shown in detail in the application of F. T. Boesch, D. A. Nash and L. Schenker, Serial No. 50,916, filed August 22, 1960.

The remaining circuitry shown in FIG. 1 includes the limiter 15, tuned circuits 17, 19, 21, and 23 and detector and output circuits 25, 27, 29, and 31. Each of these circuits performs a function in the low frequency network B substantially identical to the function performed by its counterpart in the high frequency network A. Accordingly, the operation of the receiver may be described with reference to its low frequency network B in terms substantially identical to those employed above in the description of the high frequency network A.

Figure 2:
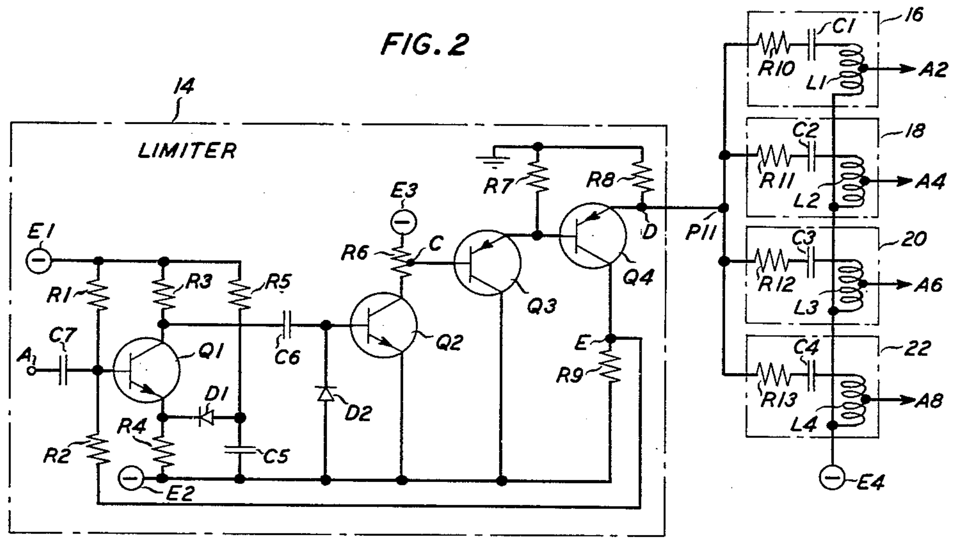
FIG. 2 is a schematic circuit diagram of one of the limiters shown in block form in FIG. 1.

A schematic circuit diagram of limiter 14, shown in block form in FIG. 1, is shown in FIG. 2. Briefly, the limiter 14 employs two stages of limiting, which include transistors Q1 and Q2, respectively, and their associated circuit components, followed by two cascaded emitter-follower stages which include transistors Q3 and Q4, respectively, and their associated circuit components. The emitter-follower stages provide the very low output impedance which is necessary to drive the series tuned circuits efficiently. As shown, a negative feedback path links the collector of the output transistor Q4 to the lower terminal of resistor R2, thus providing a complete feedback loop from the output to the input of the limiter. Also shown in schematic circuit diagram form in FIG. 2 are the tuned circuits 16, 18, 20, and 22, each including a respective one of the resistors R10 through R13, a respective one of the capacitors C1 through C4 and a respective one of the inductors L1 through L4. Biasing voltages for the limiter are provided by the sources E1, E2, and E3, and the source E4 supplies output power for the tuned circuits.

The detailed operation of the limiter 14 may best be understood by tracing the path of an illustrative signal. It is assumed, for illustrative purposes, that a single sine wave signal is fed to input point A. Application of this signal to the base of transistor Q1, the first stage of the limiter, is made by way of a coupling capacitor C7. Resistors R1 and R2 bias the base of transistor Q1 approximately midway between the negative supply potentials E1 and E2, which in one illustrative embodiment were fixed at —24 and —48 v., respectively. Resistor R3 is the collector load resistor for the first stage of limiting. Half of the current flowing through the emitter resistor R4 is supplied by way of resistor R5 and the remaining half is supplied directly from the emitter of transistor Q1. On an A.-C. signal, as soon as the voltage at the base of transistor Q1 goes slightly positive, diode D1 is back-biased so that all of the current flowing through resistor R4 is supplied by the emitter circuit of transistor Q1. Since the total current through R4 remains essentially the same, the emitter current of transistor Q1 and hence the collector current, which is approximately the same as the emitter current, doubles in magnitude. When negative half cycles are applied to its base, transistor Q1 is turned off owing to the fact that current flowing from capacitor C5 through diode D1 and resistor R4 holds the emitter at a fixed potential. Accordingly, during the negative half cycles of the input signal the collector current of transistor Q1 drops to zero.

The resulting output from transistor Q1 is a current square wave which is applied by way of capacitor C6 to the base of transistor Q2. Diode D2 provides a conducting path for the negative half cycles from the collector of transistor Q1 so that the impedance looking into the base of transistor Q2 is essentially the same on both positive and negative half cycles. The output of the second stage of limiting is taken from the collector of transistor Q2 or more specifically from the tap point C on resistor R6. At this stage the peak-to-peak magnitude of the signal is typically on the order of 4 v., which level is maintained irrespective of the amplitude of the input signals provided, however, that the input signals exceed a preassigned threshold.

Transistors Q3 and Q4 are cascaded, emitter-follower stages which load emitter resistors R7 and R8, respectively. The output of transistor Q4, which is applied to output point P11, drives the series tuned circuits as described in the discussion of FIG. 1. The current in the emitter circuit of transistor Q4 and therefore the current in the collector of transistor Q4 is almost entirely dependent upon the load presented by the tuned circuits. In accordance with the invention, the resonant frequency of each of the tuned circuits, and hence the minimum impedance of each, occurs at a corresponding one of the signal frequencies. As a result, the voltage appearing across feedback resistor R9, which is essentially sinusoidal, achieves maximum amplitude whenever the limiter input is at one of the preassigned signaling frequencies. The feedback signal, which differs in phase by 180° from the limiter input, is fed back to the input by a conducting path connecting one side of biasing resistor R2 to the collector of transistor Q4. Inasmuch as the amplitude of the feedback signal is greater at signaling frequencies, these frequencies are necessarily de-emphasized with respect to nonsignaling frequencies in the limiter input. As a result of the limiter action described, the amplitude of the signal at the collector of transistor Q4 at any given frequency is fixed irrespective of input amplitude with the proviso again, however, that the input signal must initially exceed a preassigned threshold. Accordingly, guard frequency action is necessarily greater at lower level signal inputs than at the relatively higher levels. Although this relation reduces the signal-to-noise ratio at lower signal amplitudes, protection against digit simulation at low levels, where the need for protection is relatively great, is considerably enhanced thereby.

Figure 3:
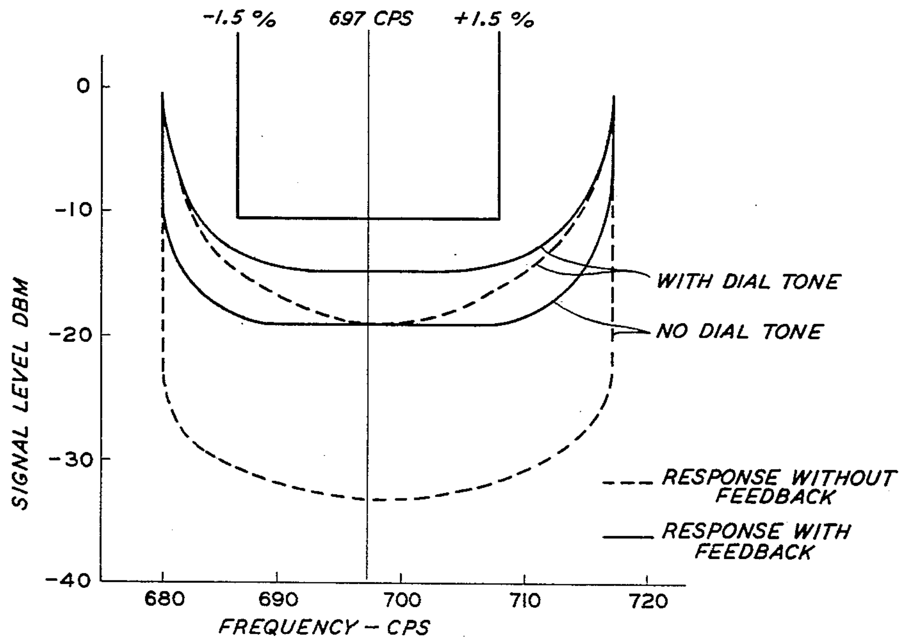
FIG. 3 is a plot of the sensitivity versus frequency characteristics of a multifrequency receiver in accordance with the invention.

The effect of negative feedback on receiver sensitivity, as employed in accordance with the principles of the invention, may be seen by examining curves showing the minimum signal amplitudes to which a receiver will respond plotted against frequency. Such curves, termed U curves, present a clear picture of the bandwidth sensitivity capability of a receiver. FIG. 3 shows illustrative U curves for the low-frequency side of a multifrequency signal receiver and compares the curves which illustrate the performance of a conventional receiver with the performance of a receiver constructed in accordance with the principles of the invention. Additionally, in each case, results both with and without dial tone are shown. The open rectangle which is plotted inside of the U curves marks the extreme of anticipated frequency variation from the center frequency of 697 c.p.s., an arbitrary illustrative signaling frequency, and the anticipated minimum level of bona fide signals at the receiver input. For optimum protection against digit simulation, it is evident that the U curve should be brought as close as possible to the rectangle outlining the limits of receiver signals, bearing in mind the need for the retention of adequate signaling margins. It is apparent from the dotted U curves that in a conventional receiver, without negative feedback employed as described, the sensitivity of the receiver in the absence of dial tone is far greater than required. The large area below the signal-limit rectangle represents excess vulnerability to digit simulation. With feedback added in the manner described, however, sensitivity in the absence of dial tone is considerably reduced, as shown. Yet, with dial tone present the reduction in sensitivity which results from the employment of feedback is still not excessive.

Another significant aspect of the application of the principles of the invention is the very substantial and desirable flattening effect on the bottom of the U curves. This effect may be explained by the fact that there is less feedback at the edges of each signaling band than in the center, the amount of feedback being controlled, as discussed above, by the impedance of the respective tuned circuits.

Figure 4:
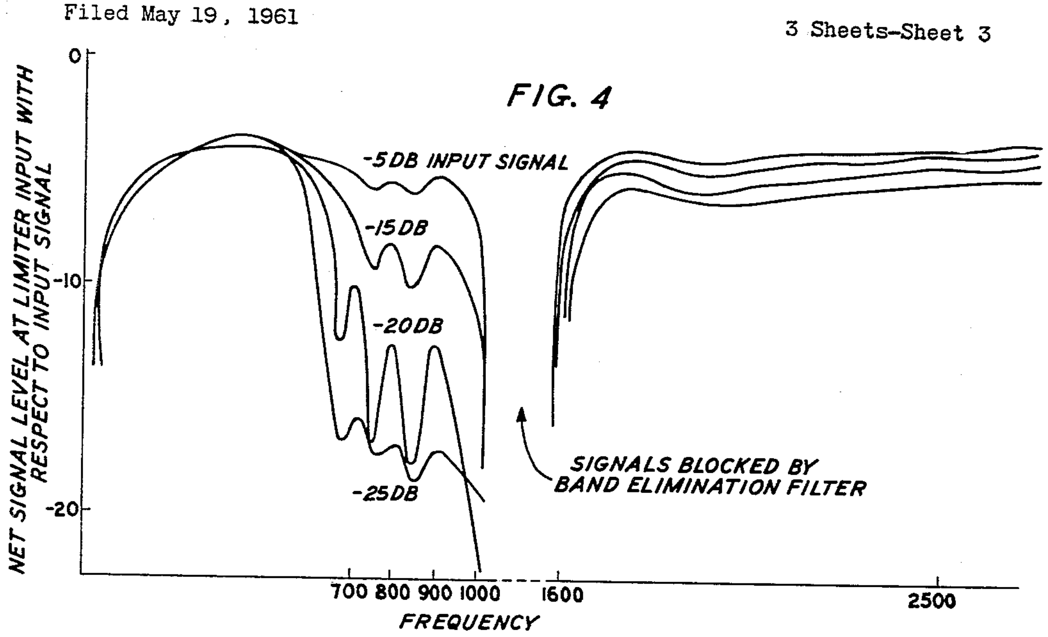
FIG. 4 is a plot of the net signal level at the limiter input with respect to the receiver input signal versus frequency for a multifrequency receiver in accordance with the invention.

The reduction of digit simulation wich is achieved by decreasing the sensitivity of a multifrequency receiver in the fashion shown by the plot of FIG. 3 is illustrative of only one of the two primary aspects by which receiver reliability is enhanced in accordance with the principles of the invention. The second aspect relates to the emphasis of guard frequencies or, stated otherwise, to the accentuation of nonsignaling frequencies. In theory, it is clear that the degree of guard frequency action that is achieved by negative feedback applied in accordance with the principles of the invention is dependent on the amplitude of the incoming frequencies. However, in order to determine the precise amount of guard frequency action achieved with feedback at various frequencies and signal input levels, curves of net limiter input amplitude versus frequency have been plotted for various signal levels at the receiver input. An illustrative set of these curves for the low frequency side of a multifrequency receiver embodying the principles of the invention is shown in FIG. 4. Specifically, four plots at 5 db intervals are shown. It is apparent that very little pre-emphasis of nonsignaling frequencies occurs at higher input levels, illustrated by the relatively flat response for the —5 db input signal. As the input level is reduced, however, pre-emphasis obviously increases. With lower level inputs, illustrated by the —20 db and —25 db plots, the signalling band frequencies are considerably suppressed with respect to the rest of the voice band frequencies. Increased effectiveness at lower levels is particularly desirable inasmuch as the bulk of potential digit simulations occur at these levels.

Figure 5:
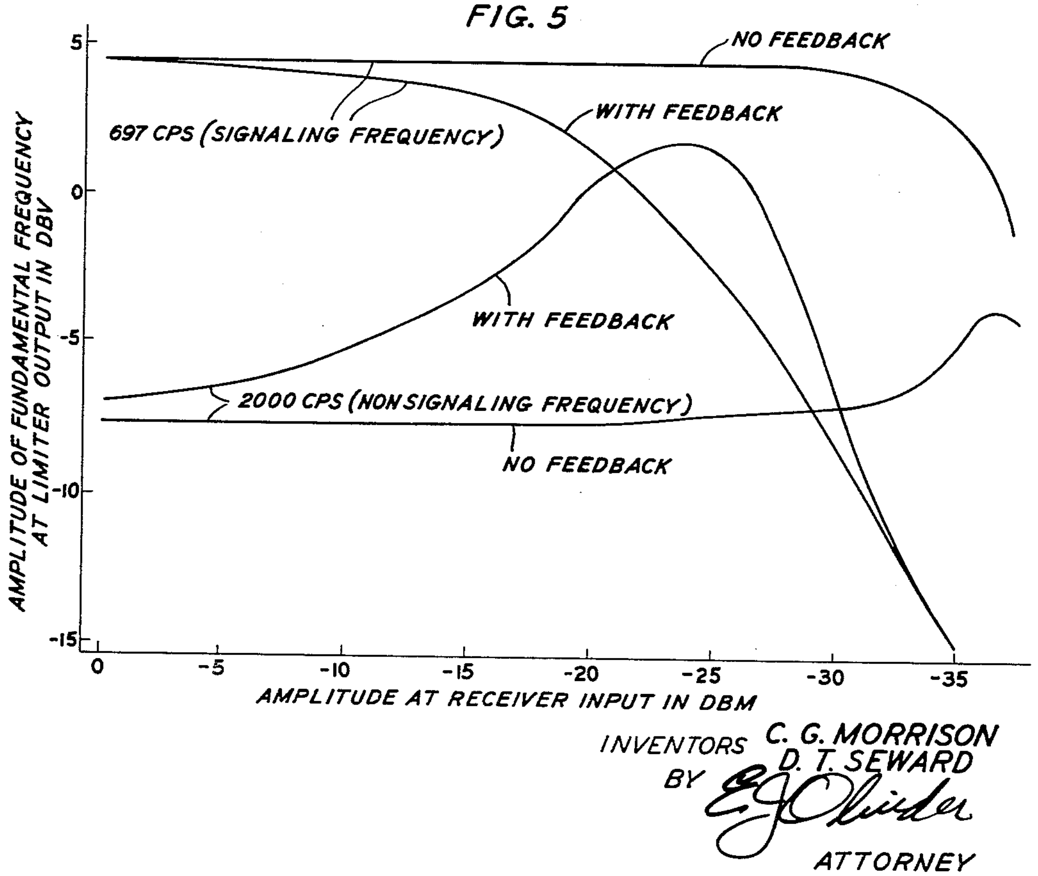
FIG. 5 is a plot of signal amplitude at the limiter output versus amplitude at the receiver input illustrating the differences in receiver operation with and without the use of negative feedback.

To obtain additional measurements of the effectiveness of those features of the invention which result in emphasizing nonsignaling frequency components, tests may be conducted in which a signaling frequency and an interfering frequency 6 db below the signaling frequency are introduced at the receiver input. The fundamental components of the signaling frequency and of the interfering frequency are then measured by connecting a wave analyzer at the limiter output. Such tests have been performed both with and without feedback at various input levels. A plot of the results achieved in an illustrative one of these tests is shown in FIG. 5. It can be seen from the curves plotted in FIG. 5 that as the level of the two frequencies at the receiver input is lowered, guard frequency action increases and at a level of —21 dbm the interfering frequency (2000 c.p.s.) at the limiter output becomes greater in amplitude than the signal frequency in spite of the fact that its level at the receiver input is 6 db lower. Moreover, the amplitude of the signaling component at the limiter output is considerably reduced by the presence of the interfering frequency. As indicated, such is not the case in the absence of feedback. Also significant in this connection is that, in accordance with the invention, the threshold of each of the detectors 24 through 31 (FIG. 1) is set about 2 db below the peak of the tuned circuit response curves and, as a result, the reduction in amplitude of the signaling component with an interfering tone present has the effect of narrowing the detector bandwidth to the point where, at lower levels, detector operation even by a midband frequency component is prevented.

It is to be understood that the above-described arrangements are illustrative of the principles of this invention. Numerous other arrangements may be designed by those skilled in the art without departing from the spirit and scope of the invention.

What is claimed is:

1. In a multifrequency signal receiver including a signal input point and a plurality of tuned circuits, means including an input limiting stage and an output limiting stage for converting tone burst input signals applied to said input point to substantially symmetrical square waves and for applying said waves to said tuned circuits, and means for providing dual protection against false operation of said receiver by noise and speech, said last named means comprising means for applying a negative feedback signal from the output of said output stage to the input of said input stage, the amplitude of said feedback signal being determined jointly by the amplitude and frequency characteristics of said input signals and by the impedance characteristics of said tuned circuits, said feedback signal performing thereby a dual function in controlling the sensitivity of said receiver and in preemphasizing preselected nonsignaling frequencies.

2. A communications receiver for translating a coincident pair of frequency division tone input signals into direct current space division output signals comprising, in combination, a plurality of series tuned circuits in parallel-relation each having a resonant frequency corresponding to a respective preselected signaling frequency, and circuit means including an input point and an output point responsive to tone signals applied to said input point for applying a train of uniform amplitude pulses to each of said tuned circuits, said pulses occurring at a frequency determined by the dominant frequency component of said tones at said input point, said circuit means further including means for applying a negative feedback signal from said output point to said input point, said feedback signal having amplitude peaks at frequencies directly determined by said tuned circuits, thereby effectively reducing the sensitivity of said circuit means to tone signals at said resonant frequencies by a first degree and reducing the sensitivity of said circuit means to tone signals at frequencies other than said resonant frequencies by a second degree, said first degree exceeding said second degree.

3. A multifrequency signal receiver comprising, in combination, a first network for identifying and translating signals of a relatively high frequency, a second network for identifying and translating signals of a relatively low frequency, each of said networks including a respective bank of tuned circuits each having a resonant frequency corresponding to a respective one of a plurality of preselected signaling frequencies, each of said networks further including a respective limiter circuit responsive to oscillatory signals exceeding a preassigned threshold for applying a train of constant amplitude square waves to its respective bank of tuned circuits, each of said limiter circuits including a respective dual function circuit means for reducing the sensitivity of said limiter by a first preassigned proportion for all frequency components of said input signals occurring at the resonant frequencies of the corresponding one of said banks of tuned circuits and for reducing the sensitivity of said limiter by a second preassigned proportion for all other frequency components of the signal applied to said limiter, both of said proportions varying inversely over a predetermined range with the magnitude of said input signals.

4. Apparatus in accordance with claim 3 wherein each of said limiters comprises two single transistor limiting stages and a single transistor output stage in emitter-follower configuration.

5. Apparatus in accordance with claim 4 wherein said dual function circuit means includes means for applying a negative feed-back signal from the output to the input of said limiter.

6. In a multifrequency signal receiver, in combination, a plurality of series tuned circuits in parallel relation each having a resonant frequency corresponding to a respective one of a plurality of preselected signaling frequencies, means including a limiter for applying input signals to said tuned circuits thereby to develop an output signal from that one of said tuned circuits whose resonant frequency matches the dominating frequency of said input signal, said limiter including negative feedback circuit means integral therewith for reducing the over-all sensitivity of said limiter across a relatively wide band of frequencies, by a first preassigned proportion and for reducing the sensitivity of said limiter to all frequency components of said input signals occurring at the resonant frequencies of said tuned circuits by a second preassigned proportion, said second proportion exceeding said first proportion, both of said proportions varying inversely with the magnitude of said input signals over a predetermined range.

7. Apparatus in accordance with claim 6 wherein said limiter comprises first and second single-transistor common-emitter limiting stages in cascade relation and first and second single-transistor, emitter-follower impedance matching stages in cascade relation and wherein said feedback circuit comprises a conducting path from the base of the transistor of said first limiting stage to the collector of the transistor of said second impedance matching stage.

8. A receiver for identifying and translating coincident pairs of oscillatory input signals, comprising, in combination, a first network for identifying and translating all of said signals occurring at relatively high frequencies, a second network for identifying and translating all of said signals occurring at relatively low frequencies, means for blocking those of said signals characterized by relatively low frequencies from said first network, and means for blocking those of said signals characterized by relatively high frequencies from said second network, each of said networks comprising a respective group of series tuned circuits in parallel relation, each of said networks further including a limiter circuit having an input and an output stage whereby all of said signals which exceed a preselected threshold are limited in amplitude and are applied as constant amplitude square waves to the corresponding group of said tuned circuits, each of said limiter circuits further including respective means comprising a negative feedback circuit for reducing the sensitivity of said limiter by a first preassigned proportion for all frequency components of said input signals occurring at the resonant frequencies of the corresponding one of said groups of tuned circuits and for reducing the sensitivity of said limiter by a second preassigned proportion for all other frequency components of the signal applied to said limiter, said first proportion exceeding said second proportion, and both of said proportions varying inversely over a predetermined range with the magnitude of said input signals.

References Cited in the file of this patent

UNITED STATES PATENTS

| | | |
|---|---|---|
| 2,654,002 | Hooij Kamp et al. | Sept. 29, 1953 |
| 2,658,112 | Davison et al. | Nov. 3, 1953 |
| 2,806,903 | Hargreave et al. | Sept. 17, 1957 |
| 2,935,572 | Hastings et al. | May 3, 1960 |